(12) United States Patent
Derby, Jr.

(10) Patent No.: US 6,180,910 B1
(45) Date of Patent: Jan. 30, 2001

(54) FORCE CONTROL TECHNIQUES ON A RESISTANCE WELDING MACHINE

(75) Inventor: William M. Derby, Jr., Bethlihem, PA (US)

(73) Assignee: Automation International Inc., Danville, IL (US)

(*) Notice: Under 35 U.S.C. 154(b), the term of this patent shall be extended for 0 days.

(21) Appl. No.: 09/351,768

(22) Filed: Jul. 12, 1999

Related U.S. Application Data

(60) Provisional application No. 60/105,907, filed on Oct. 28, 1998.

(51) Int. Cl.[7] .................................................. B23K 11/02
(52) U.S. Cl. ........................................ 219/86.51; 219/101
(58) Field of Search .............................. 219/86.51, 101, 219/102, 103, 104

(56) References Cited

U.S. PATENT DOCUMENTS

| | | | |
|---|---|---|---|
| 4,408,114 | 10/1983 | Nakata et al. ......................... | 219/110 |
| 4,634,828 | 1/1987 | Okabe et al. ....................... | 219/117.1 |
| 5,021,625 | 6/1991 | Destefan et al. ..................... | 219/109 |
| 5,124,521 | 6/1992 | Boyer et al. .......................... | 219/110 |
| 5,367,138 | 11/1994 | Moss et al. .......................... | 219/109 |
| 5,436,422 | 7/1995 | Nishiwaki et al. ................... | 219/110 |
| 5,440,092 | 8/1995 | Kawai .................................. | 219/110 |
| 5,483,035 | 1/1996 | Kawai et al. ........................ | 219/110 |
| 5,523,541 | 6/1996 | Ishikawa ............................. | 219/110 |
| 5,545,872 | 8/1996 | Nakajima et al. .................... | 219/89 |
| 5,582,747 | 12/1996 | Sakai et al. ........................ | 219/86.41 |
| 5,587,091 | 12/1996 | Kawagoe et al. .................... | 219/110 |
| 5,591,355 | 1/1997 | Ishikawa ............................. | 219/110 |
| 5,652,488 | * 7/1997 | Rennau .............................. | 219/86.51 |

* cited by examiner

Primary Examiner—Clifford C. Shaw
(74) Attorney, Agent, or Firm—Banner & Witcoff, Ltd.

(57) ABSTRACT

The present invention is an improved welding technique that provides real-time control of the servo valve to account for the changing conditions of the parts being welded. The present invention may be implemented within any electrical welder having at least one movable platen for carrying a part to be welded, at least one hydraulic cylinder coupled to the movable platen, the hydraulic cylinder having a first chamber and a second chamber, and a servo valve coupled to the hydraulic cylinder. The present invention includes means for making instantaneous pressure measurements within the first and second chambers of the hydraulic cylinder. Also included is a force control module that reacts to the pressures within the first and second chambers to control the servo valve. The force control module receives the instantaneous pressure information from the first and second chambers of the hydraulic cylinder and determines whether the platen is moving and how far the servo valve is from its target force. Based on this information, the proportional and integral contributions of a PI controller within the force control module are adjusted. The servo valve may thereby chase the desired force when movement is possible and may scale back the output when the close to the desired force. Further, the risk of the servo valve overshooting the desired force may be avoided.

13 Claims, 4 Drawing Sheets

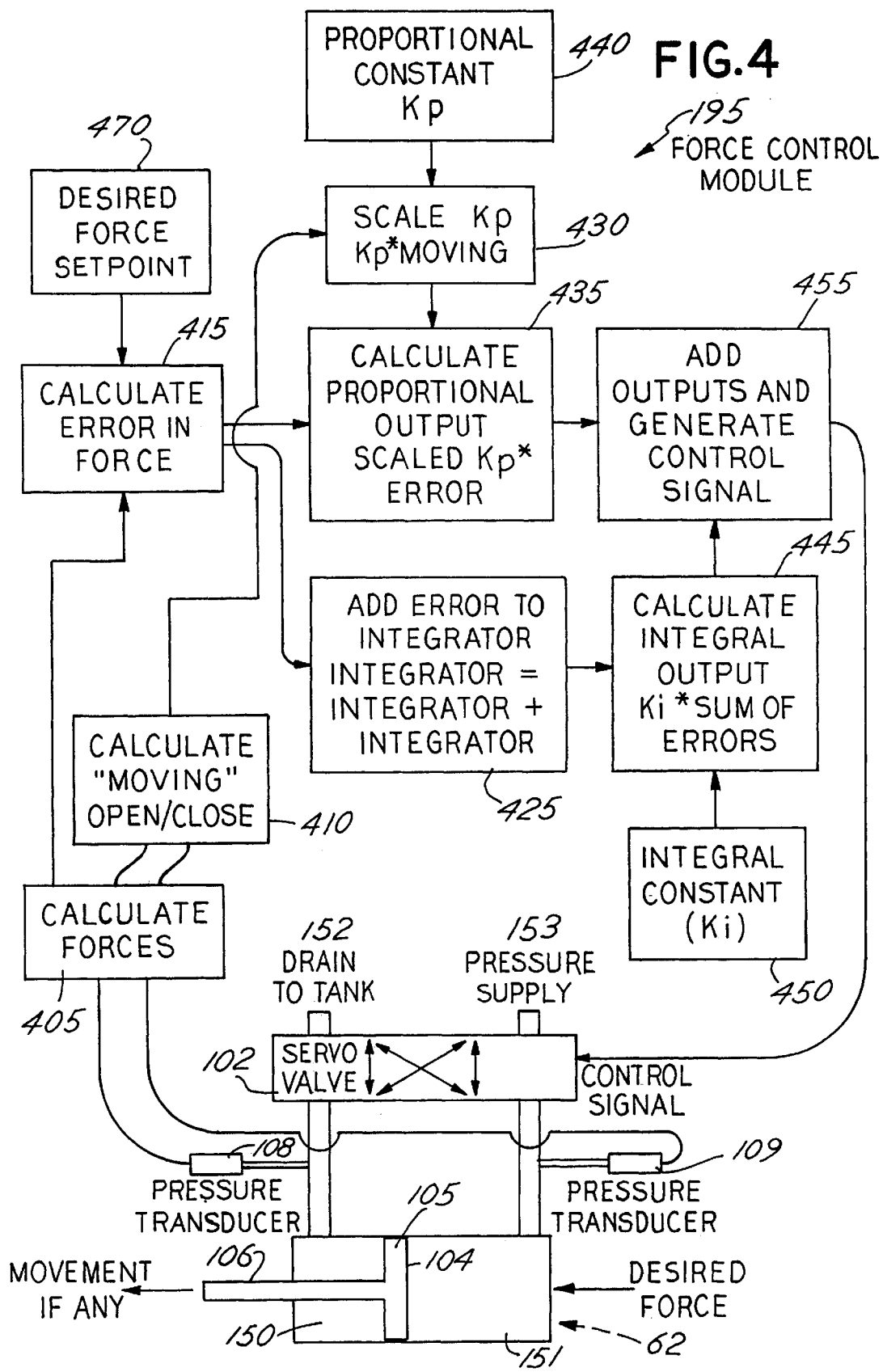

FORCE CONTROL TECHNIQUES ON A RESISTANCE WELDING MACHINE

This application claims the benefit of U.S. Provisional Application Ser. No. 60/105,907 filed on Oct. 28, 1998 for which priority is claimed. This provisional application is incorporated herewith by reference in its entirety.

BACKGROUND OF THE INVENTION

1. Field of the Invention

In general, the present invention relates to welding techniques, and more particularly to techniques for controlling the force on a resistance welding machine.

2. Statement of Related Art

Resistance welding machines are well known in the art. In a resistance welding process, two pieces of material are held by clamps so they are touching or are nearly touching. An electric current is then delivered through these pieces. The current heats up the interface between the two pieces causing the material to become soft. At that point, the machine rapidly brings the two pieces together which forges the weld. Flash welds and butt welds are two common types of resistance welding techniques.

In certain welding applications, such as railroad rails, it is desirable to have welds forged to a specific force. By forging to a specific force instead of a distance, each weld produced will forge to the correct distance according to the amount of heat that is in the part. Since the actual amount of heat introduced into the part tends to vary, this forging technique leads to more constant welds.

In other welding applications, such as flash welding parts with large cross sections, it is desirable to preheat the parts prior to flashing in order to minimize the amount of material consumed in the flash and to decrease welding time. Preheating is generally accomplished by forcing the two pieces together for some time and then separating them. When the pieces are in contact, the electrical current will cause the pieces to heat according to their resistance. By holding the two pieces together at a constant force, the resistance between the parts can be made more consistent, which allows for the heat produced in the pieces to be controlled more precisely.

In other welding applications, such as butt welding, it is desirable to control the force with which the parts are held together. The butt weld requires that the two parts be in solid contact with each other. When current is delivered through the parts, the interface between the parts heats up due to its electrical resistance. It is critical to the welding process that this resistance not be excessive so as to cause overheating of the parts. If the parts overheat, there is a risk ejecting material from the joint in the form of sparks. These sparks are known as flashing. Flashing unevenly removes heat and material from the joint, lowering its quality, or even preventing proper forging. In most cases, the parts will have to be scrapped. To avoid these undesirable results, butt welding equipment must incorporate a method for controlling the force between the pieces. Further this force may be modified during the course of the weld depending on the requirements of the weld. It is also important that the force be achieved quickly with minimal overshoot to prevent flashing.

In all these welding applications, the welding machine typically utilizes a hydraulic servo valve that controls the movement of one of the parts being welded. By varying the flow of oil, the servo valve also applies a force to the movable part. By maintaining a constant force as applied by the servo valve, the two pieces are maintained in contact with each other thereby reducing the risk of overheating of the parts at the interface.

Resistance welding machinery incorporate various techniques to control the force between the pieces. The simplest technique is to use compressed air instead of hydraulic oil. This technique has limitations in that it is only suitable for small welding applications due to the relatively low pressure of compressed air. Also this technique is generally stable only at a specific pressure which makes it difficult to quickly change pressure to a changing force setpoint. Another technique uses a standard Proportional Integral Derivative (PID) - type controller to control the servo valve. This technique has limitations in that it responds quickly to a change in force but overshoots the desired target in an oscillatory manner. This characteristic overshooting can be minimized at the expense of the quickness of response. Other limitations to this technique are that it only uses knowledge of the overall force and a history of previous force. This would be sufficient if there were a constant force to be acted upon. In resistance welding machinery, the force is being applied to an object whose characteristics are being changed over time due to heating. Since the PID control has no knowledge on the changes in the parts, and is tuned for a specific situation, it will not behave optimally in all situations.

It is therefore an object of the present invention to provide an improved welding technique for controlling the force supplied by the servo valve.

SUMMARY OF THE INVENTION

The present invention is an improved welding technique that provides stable real-time control of the force produced by the servo valve regardless of the changing conditions of the parts being welded. The present invention may be implemented within any electrical welder having at least one movable platen for carrying a part to be welded, at least one hydraulic cylinder coupled to the movable platen, the hydraulic cylinder having a first chamber and a second chamber, and a servo valve coupled to the hydraulic cylinder. The present invention includes means for making instantaneous pressure measurements within the first and second chambers of the hydraulic cylinder. Also included is a force control program that reacts to pressures within the first and second chambers to control the servo valve. The force control software receives the instantaneous pressure information from the first and second chambers of the hydraulic cylinder and determines whether the platen is moving and how far the servo valve is from its target force. The force control software implements an adaptive proportional/integral (PI) controller. Based on the instantaneous pressure information, the force control software adjusts the proportional constant of the PI controller.

In accordance with the preferred embodiments, the servo valve may be operated to supply a controlled force to the parts being welded. Advantageously, by periodically adjusting the contributions of the proportional portion of the PI controller, the servo valve may chase the desired force when movement is possible and may scale back the output when the close to the desired force. Further, this periodic adjusting of the PI controller reduces the risk of the servo valve overshooting the desired force.

These as well as other novel advantages, details, embodiments, features and objects of the present invention will be apparent to those skilled in the art from following the detailed description of the invention, the attached claims and accompanying drawings, listed herein below, which are useful in explaining the invention.

BRIEF DESCRIPTION OF THE DRAWINGS

In the text which follows and in the drawings, wherein similar reference numerals denote similar elements throughout the several views thereof, the present invention is explained with reference to illustrative embodiments, in which:

FIG. 4 is a block diagram depicting the procedure for providing control to the servo valve in accordance with a preferred embodiment of the present invention.

DETAILED DESCRIPTION OF THE INVENTION

For a better understanding of the present invention, reference may be had to the following detailed description taken in conjunction with the appended claims and accompanying drawings.

Figure 1:
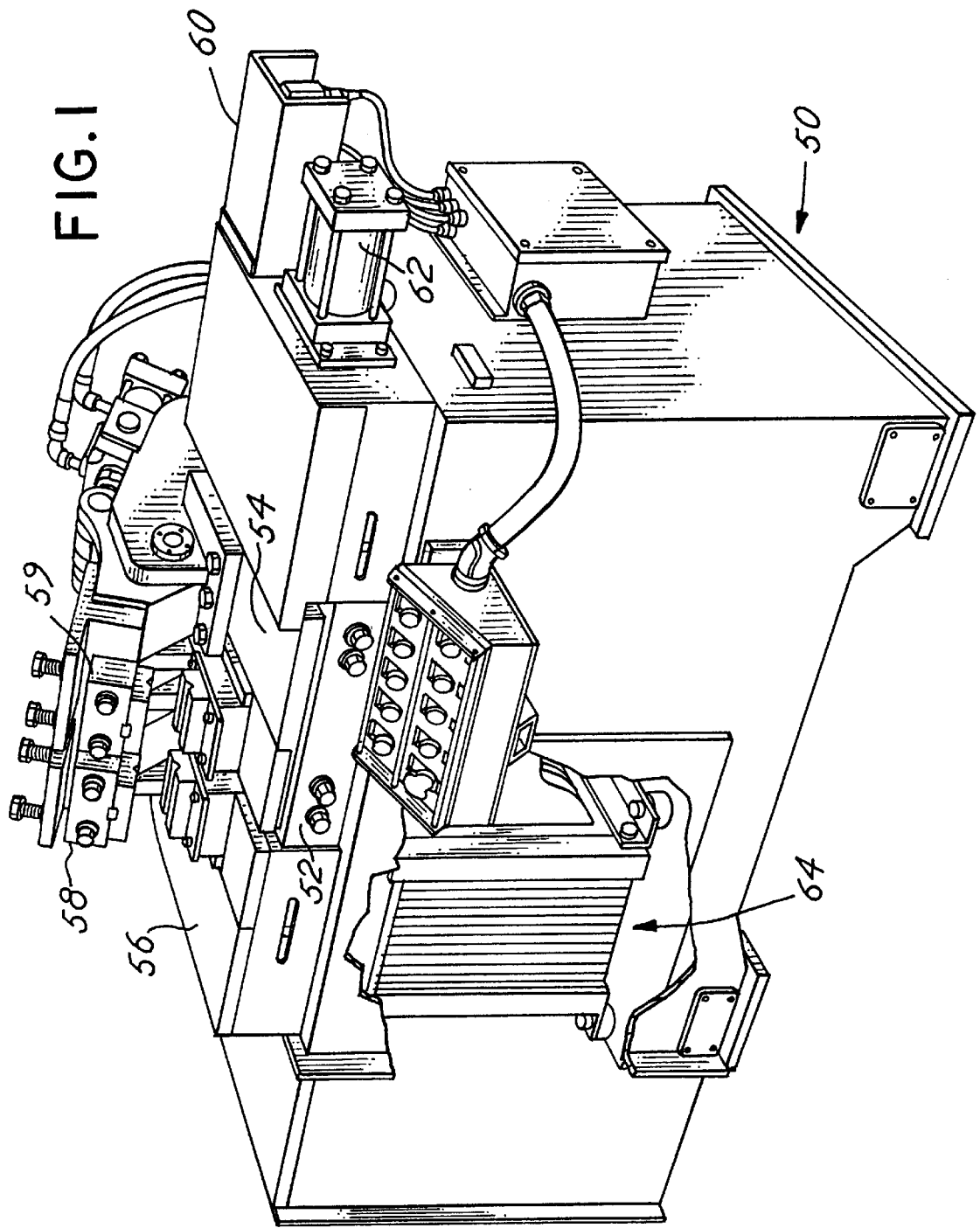
FIG. 1 depicts a conventional welder suitable for use with the present invention.
Figure 2:
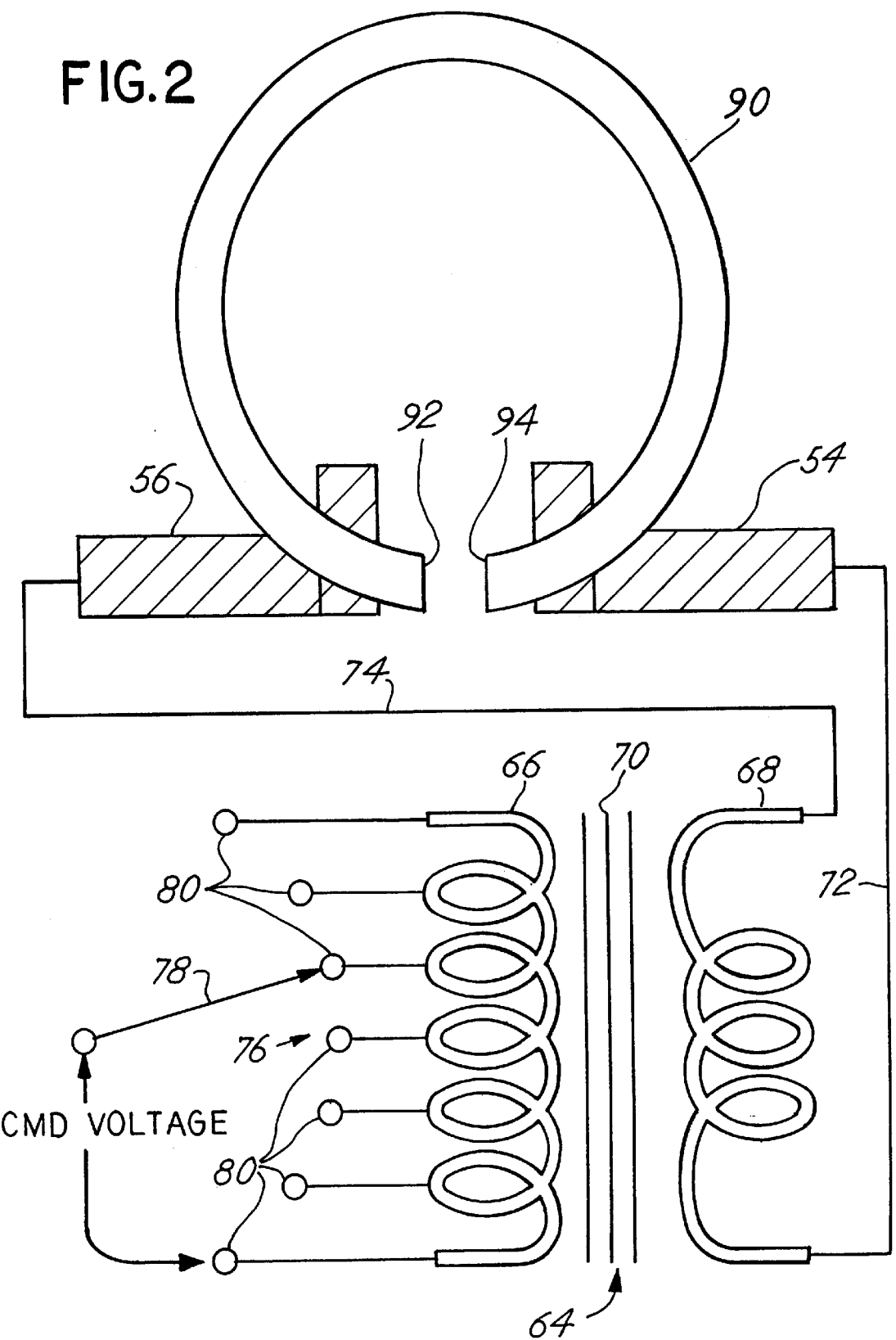
FIG. 2 illustrates an exemplary part to be welded as mounted in a conventional platen.

The present invention may be incorporated within any conventional or future developed welder. For example, FIG. 1 depicts a conventional AC welder 50 suitable for use with the present invention. Welder 50 comprises a side bar 52, as well as a movable platen 54 and a stationary platen 56 that carry clamps 58 and 59 for holding a part to be welded. Movable and stationary platens 54 and 56 are electronically isolated and are coupled to a power supply. Welder 50 also includes a platen position sensor 60, a hydraulic cylinder 62 and a transformer 64. Referring to FIG. 2, transformer 64 has a primary winding 66 and a secondary winding 68 that are magnetically coupled by a core 70. Leads 72 and 74 electrically connect secondary winding 68 with platens 54 and 56, respectively. Transformer 64 also includes a tap assembly 76 having a switch 78 that conducts voltage from a AC source to various tap conductors 80 connected to primary winding 66. Platens 54 and 56 are adapted to hold a weld part 90 having ends 92 and 94. The weld part may form a ring which conducts current, thereby imposing an electrical load on secondary winding 68.

Figure 3:
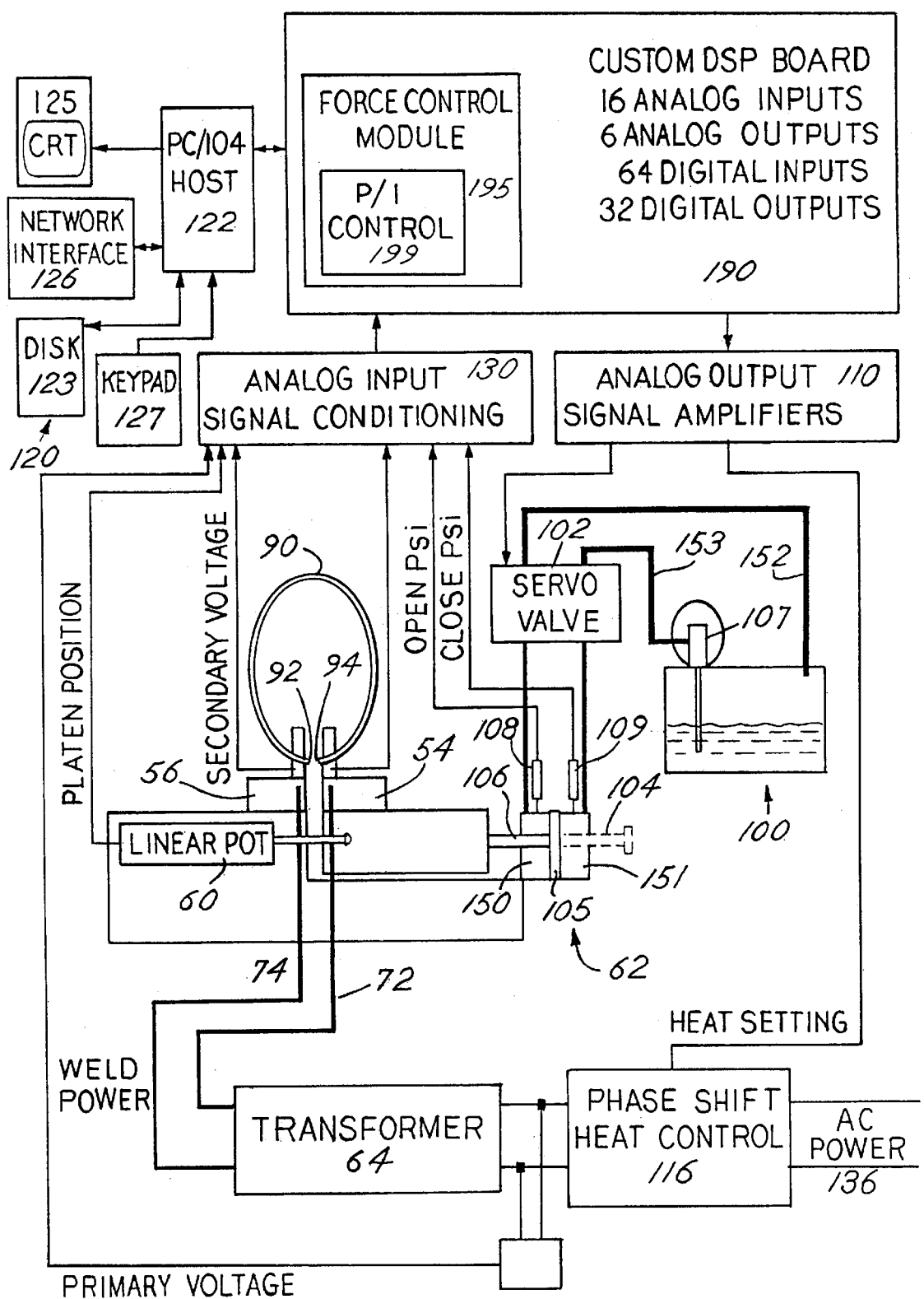
FIG. 3 is a schematic drawing of the electrical components of a welding machine made in accordance with a preferred embodiment of the present invention.

FIG. 3 is a schematic drawing of the electrical components of a welding machine made in accordance with a preferred embodiment of the present invention. Although not required, the present invention is preferably implemented within a welding system similar to that disclosed in U.S. Pat. No. 5,367,138 entitled "Welding Assurance Control Techniques" and assigned to Automation International, Inc. (hereinafter referred to as "the 138 patent"). The '138 patent is incorporated herein by reference in its entirety. Those skilled in the art will appreciate that the present invention may be implemented within any number of welding systems. Referring to FIG. 3, the movement of platen 54 is controlled by a hydraulic assembly 100 having a servo valve 102 that admits hydraulic fluid to a cylinder 62. Servo valve 102 is preferably a high-speed bidirectional servo valve. Servo valve 102 is provided with relatively constant supply of oil by a pump 107 and optionally an accumulator system (not shown). Servo valve 102 controls the flow of oil to and from cylinder 62. Cylinder 62 has a first chamber 150 and a second chamber 151 that is separated by a piston 105. Piston 105 inside cylinder 62 moves a rod 106 that is mechanically coupled to platen 54. Servo valve 102 has coupled, variable openings which connect the first and second chambers 150 and 151 of cylinder 62 with a drain line 152 and a pressure line 153.

Hydraulic fluid is supplied to servo valve 102 by a pump 107. The pump 107 provides a constant pressure to servo valve 102. Typically, the pump provides a pressure in the range of 1000 to 2000 psi. The pressure exerted by servo valve 102, however, is initially less than that exerted by the pump 107 due to the finite amount of rise time required to achieve the pressure provided by the pump.

System pressure of the hydraulic fluid in first and second chambers 150 and 151 is measured by first and second pressure transducers 108 and 109 respectively. Pressure in first chamber 150 allows movable platen 54 to increase the distance between ends 92 and 94 of part 90 and is referred to as the open side. Pressure in second chamber 151 allows movable platen 54 to decrease the distance between ends 92 and 94 of part 90 and is referred to as the close side.

Hydraulic assembly 100 is preferably controlled by a Digital Signal Processor (DSP) system 190 containing an analog output system having signal amplifiers 110 to produce the required drive voltages. DSP system 190 also may also control a phase shift heat control 116 that controls the power conducted to the transformer unit 64 from AC power lines 136. DSP system 190 also may contain a force control module 195. Force control module 195 is discussed in further detail herein.

DSP system 190 also contains an analog input system which includes various input signal conditioning circuits 130 that monitor various characteristics of welder 50. Input signal conditioning circuits 130 may include those disclosed in the '138 patent. In accordance with a preferred embodiment of the present invention, input signal conditioning circuits 130 monitor the hydraulic pressure within first and second chambers 150 and 151 via first and second transducers 108 and 109. Input signal conditioning circuits 130 may also monitor, for example, the primary voltage of AC power line 136, the position of movable platen 54, and/or the voltage across secondary winding 68 of transformer 64. For example, in the case of monitoring platen position, a linear potentiometer 60 is mechanically connected to movable platen 54. Potentiometer 60 varies its resistance in response to movement of platen 54, thereby providing a position-indicating signal to a platen position.

DSP system 190 may be coupled to a user interface computer 120 which provides setup information for the weld and enables the machine operator to view signals being monitored by the custom DSP 190. Interface computer 120 preferably comprises an PC/104 compatible microprocessor with a large hard disk 123 for the storage of data. A conventional monitor 125 coupled to computer 122 provides a means of communicating messages to an operator. The operator can respond to the messages via a keypad 127 coupled to computer 122. Interface computer 122 may also include a network interface 126.

DSP system 190 preferably has 16 channels of analog inputs which are simultaneously sampled, 6 channels of analog outputs, 64 channels of discreet inputs and 32 channels of discreet outputs. The general operation of the welding system of FIG. 3 is discussed in further detail in the '138 patent which is incorporated herein by reference.

Force control module 195 receives input from first and second pressure transducers 108 and 109 which measure the respective pressures within first and second chambers 150 and 151 of cylinder 62. Force control module 195 includes a proportional-integral (PI) controller 199. PI controller 199 is both a proportional controller and an integral controller. Accordingly, PI controller 199 includes a proportional term and an integral term. As shown below, the relative contribution of the proportional portion and the integral portions of PI controller 199 may be determined by the ratio of the pressure measurements from first and second pressure transducers 108 and 109.

The pressure measurements from first and second pressure transducers 108 and 109 serve to detect the force being exerted by cylinder 62. This force is compared to the desired force to produce the error in desired force. The proportional portion of PI controller 199 serves to correct for error in proportion to the error value. The integral portion of PI controller 199 serves to sum the error over a time period and correct for error faster than that by a straight proportional controller. PI controller 199 advantageously provides the benefits of both proportional and integral controllers. A straight proportional controller may not adjust the force in time to avoid overheating of part 90. A straight integral controller, on the other hand, may tend to overcompensate for the error thereby providing too much force to part 90.

In accordance with an embodiment of the present invention, force control module 195 controls the force of cylinder 62 by servo valve 102. FIG. 4 depicts a block diagram showing the procedure followed by the force control module 195 to provide control information to servo valve 102 in accordance with a preferred embodiment of the present invention. The control of force of servo valve 102 is accomplished by modifying the opening provided by servo valve 102 in response to an instantaneous force determination. At step 405, the instantaneous force determination is based on pressure measurements made by first and second pressure transducers 108 and 109. The instantaneous force determination may be calculated as follows. First, the area of piston 105, which is dependent upon the number of cylinders 62, is calculated as follows:

$$\text{Area}_{piston} = \pi \ast [\text{Cylinder}_{diameter}/2]^2 \ast \text{Cylinders}$$

The area of the open side of the rod 106 (i.e., the side defining first chamber 150) is determined as follows:

$$\text{Area}_{open} = \pi \ast [\text{Rod}_{open}/2]^2 \ast \text{Cylinders}$$

The area of the close side of the rod 104 if present (i.e., the side defining second chamber 151) is determined as follows:

$$\text{Area}_{close} = \pi \ast [\text{Rod}_{close}/2]^2 \ast \text{Cylinders}$$

The forces on both sides of piston 105 may thereby be determined as follows:

$$\text{Force}_{open} = (\text{Area}_{piston} - \text{Area}_{open}) \ast \text{Pressure}_{open}$$

$$\text{Force}_{close} = (\text{Area}_{piston} - \text{Area}_{close}) \ast \text{Pressure}_{close}$$

The effective force converted to tons is as follows:

$$\text{Force}_{tons} = (\text{Force}_{close} - \text{Force}_{open})/2000$$

As preferred, force control module 195 performs an instantaneous force determination every 1 millisecond. This instantaneous force determination is used by force control module 195 to drive PI controller 199 as discussed herein.

Still referring to FIG. 4, at step 410, a determination is made whether piston 105 is moving based on the ratio of the force measurements calculated from first and second pressure transducers 108 and 109. When pressure is supplied to second chamber 151 and piston 105 can move freely, the movement of piston 105 will increase the force in first chamber 150 that is being "pushed" to approach the force in second chamber 151 that is doing the pushing. If, however, piston 105 encounters resistance to moving (i.e., when ends 92 and 94 are in contact with each other), the force in first chamber 150 that is being pushed drops off in proportion to the amount of resistance encountered. At the extreme, when piston 105 cannot move at all, the force in first chamber 150 will drop off to zero.

For example, in the case where ends 92 and 94 are not in contact, chamber 150 is exerting little or no force against piston 105. Chamber 151 applies pressure to the right side of piston 105, causing piston 105 to shift to the left at a rate determined by the oil flow rate into second chamber 151. This is accomplished by opening of pressure line 153 of servo valve 102 to deliver oil from servo valve 102 to second chamber 151. At the same time, drain line 152 of servo valve 102 is opened to drain oil from first chamber 150 at the same rate as it is delivered to second chamber. This pumping action raises the pressure within first chamber 150 since the oil can only escape at a given flow rate. If piston 105 experiences no resistance to movement, the open and close forces, calculated from the pressures in chambers 150 and 151, will become equal. The force calculations correct for differences in available piston 105 surface area when the size of the piston rods 106 and 104 are different. The ratio of the forces in first and second chambers 150 and 151 is 1:1 or one.

In the case where ends 92 and 94 are in contact, piston 105 is pushing against a largely immovable object. Since second chamber 151 is not expanding, pressure in second chamber 151 is therefore increased. Drain line 152 is opened to drain oil from first chamber 150. However, in this case, since piston 105 cannot move, the pressure in first chamber 150 drops off to zero. The ratio of the forces in first and second chambers 150 and 151 is therefore 0:1 or zero.

Based on the above two scenarios, the ratio or forces in first and second chambers 150 and 151 may vary from 1:1 to 0:1. Accordingly, this ratio indicates, in percentage terms, the freedom of movement that the piston is encountering. This ratio calculation preferably determines the relative contributions of the proportional component of PI controller 199. The contribution of the proportional component is inversely proportional to the ratio of the force measurements calculated from the first and second pressure transducers 108 and 109. Accordingly, it is desirable that servo valve 102 aggressively chase the desired force without incurring an overshoot problem of an integral based approach.

As such, step 410 makes the following calculation:

$$\text{Moving} = |\text{Force}_{open}/\text{Force}_{close}|$$

As stated above, the moving ratio is 1 when piston 105 can freely moves and approaches 0 as movement stops. At step 415, the error for the system is calculated as the difference between the target force and the instantaneous force determination:

$$\text{Error} = \text{Setpoint} - \text{Force}_{tons}$$

Where Setpoint is the desired force in tons (established in step 470).

At step 435 of FIG. 4, the proportional output of PI controller 199 may be generated based on the error in force determined in step 415 and the scaled proportional term (from step 430). At step 430, the proportional term is scaled back (from its default value set in step 440) in proportion to the relative force being presented to first and second chambers 150 and 151 and determined in step 410. The proportional constant is scaled back by changing $K_p$ based on the Moving variable explained above and shown in the drawings (i.e., Scaled $K_p$=Moving*$K_p$). Advantageously, force control module 195 aggressively chases the desired force when movement is possible and scales back the output when close to the desired force. Force control module 195 advantageously avoids the overshoot problems of a purely integral based approach yet still provides fast response.

The integral output of PI controller 199 is determined as follows. At step 425, the error in force established in step 415 is added to the integral term of PI controller 199:

Integrator=Integrator+Error

The Integrator is initially zero and is reset whenever there is a Setpoint change. At step 445, the integral output is calculated based on the new integral term determined in step 425 and a preset integral constant $K_i$ determined in step 450. The integral output can then be generated as:

Integral$_{term}$=$K_i$*Integrator

To prevent large errors from saturating PI controller 199, the integrator output is clipped to +/−100%. If this point is reached, the error value is removed. Thus:

if |Integrator$_{term}$|>100 then Integrator=Integrator−Error if Integral$_{term}$>100 then Integral$_{term}$=100 if Integral$_{term}$<−100 then Integral$_{term}$=−100

Finally, at step 455, the proportional output and integral output of PI controller 199 are added as follows:

Control=Proportional$_{term}$+Integral$_{term}$.

This Control output is then converted to a voltage and sent to servo valve 102 via analog output conditioning circuits 110.

In accordance with the above techniques, servo valve 102 may be operated to supply a controlled force to the parts being welded. Advantageously, force control module 195 adjusts the force applied by the servo valve based on instantaneous pressure measurements of the first and second chambers 150 and 151 of cylinder 62. The instantaneous pressure measurements provide information as to whether piston 105 is moving and how far servo valve 102 is from the desired force. Based on this information, PI controller 199 provides control information to servo valve 102. Advantageously, by periodically adjusting the contribution of the proportional portion of PI controller 199, servo valve 102 may chase the desired force when movement is possible and may scale back the output when the close to the desired force. Further, this periodic adjusting of PI controller 199 avoids the risk of servo valve 102 overshooting the desired force.

Once the desired force is achieved by servo valve 102, force control module 195 maintains this force. As preferred, the contribution of the proportional term decreases when maintaining the force on piston 105. This happens since the force is actually developed by the pump 107 that is coupled to the servo valve 102 (typically 1000 to 2000 psi) which stays relatively constant. To deliver force by pump 107 requires a finite rise time due to delays from the flow of oil and pressure when servo valve 102 is opened as well a some leakage around piston 105. Accordingly, to create a force, PI controller 199 must modulate servo valve 102 such that the desired pressure is achieved. Once the desired pressure is achieved, maintaining pressures in first and second chambers 150 and 151 requires relatively minor adjustments to servo valve 102. As such, the contribution of the proportional term may be minimal. The adjustments required on servo valve 102 can be depicted as follows:

Proportional$_{term}$=Proportional$_{const}$*Moving*Error

The Proportional$_{const}$ term is usually called $K_p$ and is a preset constant term. As shown in the above equation, when piston 105 is not moving (i.e., Moving=0) or when the target force is reached (i.e., Error=0), the proportional term will be small.

In the foregoing specification, the present invention has been described with reference to specific exemplary embodiments thereof. Although the invention has been described in terms of a preferred embodiment, those skilled in the art will recognize that various modifications, embodiments or variations of the invention can be practiced within the spirit and scope of the invention as set forth in the appended claims. For example, although described in relation to a AC welding applications, the present invention may also be implemented in DC butt applications. In another example, the present invention may be implemented in standard flash-butt and other resistance welding applications. All such modifications, embodiments or variations of the invention are considered within the sphere, spirit, and scope of the invention. The specification and drawings are, therefore, to be regarded in an illustrative rather than restrictive sense. Accordingly, it is not intended that the invention be limited except as may be necessary in view of the appended claims.

What is claimed is:

1. In an electrical welder having a movable platen for carrying a part to be welded, at least one hydraulic cylinder coupled to said movable platen, each said hydraulic cylinder having a first chamber and a second chamber, and a servo valve coupled to said hydraulic cylinder, a method of controlling the force applied by the servo valve:
   (a) measuring pressures within the first and second chambers to generate a first pressure signal and a second pressure signal;
   (b) determining whether the movable platen is moving based on the first and second pressure signals to generate a moving signal;
   (c) generating a control signal based on the moving signal; and
   (d) adjusting the force applied by the servo valve in response to the control signal.

2. The method of claim 1, further comprising the step of determining the error between the actual force and the desired force to generate an error signal and wherein the step of generating a control signal is also based on the error signal.

3. The method of claim 1 wherein the step of generating a control signal includes the step of generating a proportional component and an integral component of the control signal.

4. The method of claim 3, wherein the step of generating a proportional component and an integral component of the control signal further includes the step of adjusting the proportional component as the moving signal increases.

5. In an electrical welder having a movable platen for carrying a part to be welded, at least one hydraulic cylinder coupled to said movable platen, each hydraulic cylinder having a first chamber and a second chamber, and a servo valve coupled to each hydraulic cylinder, an improved apparatus for controlling the force applied by the servo valve:

(a) at least one sensor for measuring a first pressure within the first chamber and a second pressure within the second chamber and producing a first pressure signal and a second pressure signal;

(b) a controller responsive to the first and second pressure signals to generate control information; and (c) an output device from said controller to provide the control information to the servo valve.

6. The apparatus of claim 5, wherein the at least one sensor is at least one pressure transducer.

7. The apparatus of claim 5, wherein the controller further comprises a proportional/integral controller.

8. The apparatus of claim 7, wherein the proportional/integral controller generates control information having a proportional component and an integral component.

9. The apparatus of claim 5, further comprising analog input conditioning circuits coupled to receive the first and second pressure signals and for conditioning the first and second information signals to provide the controller.

10. The apparatus of claim 5, further comprising analog output signal amplifiers coupled to receive the control information from the controller and for providing the control information to the servo valve.

11. The apparatus of claim 5, wherein the controller further comprises a digital signal processor (DSP).

12. In an electrical welder having a movable platen for carrying a part to be welded, at least one hydraulic cylinder coupled to said movable platen, each said hydraulic cylinder having a first chamber and a second chamber, and a servo valve coupled to said hydraulic cylinder, an improved apparatus for controlling the force applied by said servo valve:

(a) at least one sensor for measuring a first pressure within said first chamber and a second pressure within said second chamber and producing a first pressure signal and a second pressure signal;

(b) a controller coupled receive said first and second pressure signals and provide control information to the servo valve, the control information having a proportional component and an integral component; and (c) means for adjusting said proportional and integral components of the control information based on the pressure signals.

13. In an electrical welder having a movable platen for carrying a part to be welded, at least one hydraulic cylinder coupled to said movable platen, each said hydraulic cylinder having a first chamber and a second chamber, and a servo valve coupled to said hydraulic cylinder, an improved apparatus for controlling the force applied by said servo valve:

(a) means for measuring a first pressure within said first chamber and a second pressure within said second chamber and producing a first pressure signal and a second pressure signal;

(b) a control module coupled to receive said first and second pressure signals and providing control information to said servo valve, said control information having a proportional component and an integral component; and (c) means for adjusting said proportional and integral components of said control information.

* * * * *